US011828644B2

(12) United States Patent
Aldossary

(10) Patent No.: US 11,828,644 B2
(45) Date of Patent: Nov. 28, 2023

(54) EMERGENCY READINESS VERIFICATION SYSTEM AND METHOD OF CALIBRATION

(71) Applicant: Saudi Arabian Oil Company, Dharhan (SA)

(72) Inventor: Faleh M Aldossary, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 502 days.

(21) Appl. No.: 17/157,050

(22) Filed: Jan. 25, 2021

(65) Prior Publication Data
US 2022/0236102 A1 Jul. 28, 2022

(51) Int. Cl.
| G08B 21/00 | (2006.01) |
| G01G 19/413 | (2006.01) |
| G01G 3/02 | (2006.01) |
| G01G 21/28 | (2006.01) |
| G01G 23/01 | (2006.01) |
| G04F 1/00 | (2006.01) |
| G08B 7/06 | (2006.01) |

(52) U.S. Cl.
CPC ............ *G01G 19/413* (2013.01); *G01G 3/02* (2013.01); *G01G 21/28* (2013.01); *G01G 23/01* (2013.01); *G04F 1/005* (2013.01); *G08B 7/06* (2013.01)

(58) Field of Classification Search
CPC ........ G01G 19/413; G01G 3/02; G01G 21/28; G01G 23/01; G04F 1/005; G08B 7/06
USPC ....................................................... 340/666
See application file for complete search history.

(56) References Cited

U.S. PATENT DOCUMENTS

| 2,670,194 A | 2/1954 | Hansson |
| 7,574,911 B2 | 8/2009 | McSheffrey et al. |

(Continued)

FOREIGN PATENT DOCUMENTS

| CN | 101528176 A | 9/2009 |
| EP | 0248639 A2 | 12/1987 |

(Continued)

OTHER PUBLICATIONS

Notification of Transmittal of the International Search Report and the Written Opinion of the International Searching Authority, or the Declaration dated May 2, 2022 pertaining to International application No. PCT/US2022/011563 filed Jan. 7, 2022, pp. 1-16.

*Primary Examiner* — Naomi J Small
(74) *Attorney, Agent, or Firm* — DINSMORE & SHOHL LLP

(57) ABSTRACT

An emergency readiness verification system includes a housing, a secure weight-sensing mechanism, a vertically-actuated switch assembly, a vertically-adjustable calibration mechanism, and an alert device in communication with the vertically-actuated switch assembly. The vertically-adjustable calibration mechanism fixes a vertical position of the vertically-actuated switch assembly such that an engagement tab of the attachment extension engages an actuator of the vertically-actuated switch assembly when a weight of the fire extinguisher supported by an extinguisher attachment falls is within an alert threshold, and disengages the actuator when the weight of the fire extinguisher falls below the alert threshold or when the fire extinguisher is not supported by the extinguisher attachment.

15 Claims, 6 Drawing Sheets

(56) References Cited

U.S. PATENT DOCUMENTS

| | | | | |
|---|---|---|---|---|
| 2005/0237210 A1* | 10/2005 | McSheffrey | ........... | A62C 37/50 |
| | | | | 340/614 |
| 2009/0237239 A1* | 9/2009 | McSheffrey | ........... | G08B 17/00 |
| | | | | 340/539.24 |
| 2012/0126970 A1* | 5/2012 | Hsu | ........................ | A62C 13/78 |
| | | | | 340/521 |

FOREIGN PATENT DOCUMENTS

| FR | 1064531 A | 5/1954 |
|---|---|---|
| FR | 2380789 A1 | 9/1978 |

\* cited by examiner

EMERGENCY READINESS VERIFICATION SYSTEM AND METHOD OF CALIBRATION

TECHNICAL FIELD

The present disclosure relates to systems and methods for verification of emergency readiness of fire extinguishers and, more particularly, to systems and methods including a weight-sensing mechanism and switch for providing verification of emergency readiness of fire extinguishers.

BACKGROUND

Fire extinguishers are traditionally stationed throughout facilities for ease of access in facilities in case of a fire. Fire extinguishers come in different makes and models, but generally include a pressurized fluid stored within a tank. When discharged, fire extinguishers discharge the fluid typically as foam. The foam extinguishes flames.

Fire extinguishers may be inspected periodically to ensure the fire extinguishers are operable, not damaged, and at full capacity. Traditionally, inspections are completed by physical inspection by a user. The user may check the pressure on a pressure gauge, inspect the tank, and inspect other portions of the fire extinguisher. Some fire extinguishers are equipped with specialized pressure sensors that may send readings to remote computers.

There is a need for improved systems and methods for verification of emergency readiness of fire extinguishers. For instance, there is a need for systems and methods for verification of emergency readiness of fire extinguishers that may be universally applied to fire extinguishers.

BRIEF SUMMARY

According to the subject matter of the present disclosure, described herein is an emergency readiness verification system for a fire extinguisher, the system may comprise a housing, a secure weight-sensing mechanism, a vertically-actuated switch assembly, a vertically-adjustable calibration mechanism, and an alert device in communication with the vertically-actuated switch assembly. The housing may comprise a removable faceplate. The secure weight-sensing mechanism may be supported by the housing, may be at least partially positioned behind the removable faceplate of the housing, and may comprise a vertically-oriented weight-bearing spring, an extinguisher attachment, and an attachment extension. The removable faceplate of the housing may comprise a vertically-oriented measurement aperture. The attachment extension of the secure weight-sensing mechanism may extend from the extinguisher attachment along a vertical axis of the vertically-oriented weight-bearing spring, and comprises an engagement tab oriented to extend through the vertically-oriented measurement aperture. The vertically-adjustable calibration mechanism may be secured to the removable faceplate and extends parallel to the vertically-oriented measurement aperture. The vertically-actuated switch assembly may be secured to the vertically-adjustable calibration mechanism and may comprise an actuator that is positioned to be engaged by the engagement tab of the attachment extension. The vertically-adjustable calibration mechanism may be operable to fix a vertical position of the vertically-actuated switch assembly such that the engagement tab of the attachment extension engages the actuator of the vertically-actuated switch assembly when a weight of the fire extinguisher supported by the extinguisher attachment falls is within an alert threshold, and disengages the actuator of the vertically-actuated switch assembly when the weight of the fire extinguisher supported by the extinguisher attachment falls below the alert threshold or when the fire extinguisher is not supported by the extinguisher attachment. The alert device may generate an alert when the actuator of the vertically-actuated switch assembly is disengaged. In an examples, the vertically-oriented weight-bearing spring may comprise a spring constant k of between approximately 0.40 kg/mm and approximately 0.50 kg/mm. The vertically-actuated switch assembly may be communicatively coupled to a remote computing device, and wherein the vertically-actuated switch assembly may be operable to generate a switch signal identifying a state of the vertically-actuated switch assembly and initiate transmission of the switch signal to the remote computing device. Further, the system may include a timer circuit, and a timer reset interface, wherein the timer circuit is disposed within the housing and coupled to the alert device, the timer reset interface is coupled to the timer reset interface, the timer circuit determines whether an inspection of the fire extinguisher has occurred within an inspection time period, the timer reset interface receives input from a user, a key, an identification card, or a combination thereof to indicated that the inspection of the fire extinguisher has occurred, in response to receiving the input, the timer reset interface generates a reset signal that causes the timer circuit to reset, and in response to the timer circuit determining that the inspection of the fire extinguisher has not occurred within the inspection time period, the timer circuit instructs the alert device to generate an inspection alert. The system may further comprise a time period selection circuit, wherein the time period selection circuit is coupled to the timer circuit and the time period selection circuit provides a signal to the timer circuit that defines a length of time T for the inspection time period. The time period selection circuit may include a plurality of capacitors having a capacitance C and a plurality of resistors having a resistance R, and wherein the length of time T is determined as $T=1.1 \times R \times C$. The timer circuit may be communicatively coupled to a remote computing device, and wherein the timer circuit may be operable to initiate transmission of data identifying whether the inspection alert has been generated to the remote computing device. The vertically-actuated switch assembly may be communicatively coupled to a remote computing device, and wherein the remote computing device is operable to generate a notification when the actuator of the vertically-actuated switch assembly is disengaged, the inspection alert has been generated, or both. The remote computer device may comprise an electronic display, and the remote computing device is further operable to generate the notification on the electronic display. The system may comprise a controller, wherein the controller may be communicatively coupled to the vertically-actuated switch assembly and the alert device and the controller is operable to instruct the alert device to generate the alert when the actuator of the vertically-actuated switch assembly is disengaged. The controller may be operable to transmit data to a remote computer device and wherein the remote computer device comprises an electronic display, wherein the electronic display generates alerts identifying a status of the fire extinguisher. The alert device may comprise a light, an audio alarm device, or both. The system may further include a timer circuit and a timer reset interface, wherein the timer circuit is disposed within the housing and coupled to the alert device, the timer circuit is communicatively coupled to a remote computing device, the timer reset interface is coupled to the timer reset interface, the timer circuit determines whether an inspection of the fire extinguisher has occurred within an inspection time period, the timer reset interface receives input from a user, a key, an identification card, or a combination thereof to indicate that the inspection of the fire extinguisher has occurred, in response to receiving the input, the timer reset interface generates a reset signal that causes the timer circuit to reset, in response to the timer circuit determining that the inspection of the fire extinguisher has not occurred within the inspection time period, the timer circuit is operable to instruct the alert device to generate an inspection alert and initiate transmission of data identifying whether the inspection alert has been generated to the remote computing device, the alert device comprises a light, an audio alarm device, or both, the vertically-actuated switch assembly is communicatively coupled to the remote computing device, and the vertically-actuated switch assembly is operable to generate a switch signal identifying a state of the vertically-actuated switch assembly and initiate transmission of the switch signal to the remote computing device.

Also described is a method of calibrating an emergency readiness verification system for a fire extinguisher. The method may include attaching the fire extinguisher to an extinguisher attachment, wherein the fire extinguisher has not been discharged, allowing the vertically-oriented weight bearing spring to come to rest, positioning the vertically-actuated switch assembly at the fixed position on the vertically-adjustable calibration mechanism such that the actuator of the vertically-actuated switch assembly engages the engagement tab of the attachment extension, and securing the vertically-actuated switch assembly at the fixed position.

Additionally described is an emergency readiness verification system for a fire extinguisher, the system comprising a housing, a secure weight-sensing mechanism, a vertically-actuated switch assembly, a vertically-adjustable calibration mechanism, and an alert device in communication with the vertically-actuated switch assembly. The secure weight-sensing mechanism may be supported by the housing, and may comprise a vertically-oriented weight-bearing spring, an extinguisher attachment, and an attachment extension, the attachment extension of the secure weight-sensing mechanism extends from the extinguisher attachment along a vertical axis of the vertically-oriented weight-bearing spring, and comprises an engagement tab, the vertically-adjustable calibration mechanism may be secured to the housing and extends parallel to the vertically-oriented measurement aperture, the vertically-actuated switch assembly may be secured to the vertically-adjustable calibration mechanism and comprises an actuator that may be positioned to be engaged by the engagement tab of the attachment extension, the vertically-adjustable calibration mechanism may be operable to fix a vertical position of the vertically-actuated switch assembly such that the engagement tab of the attachment extension engages the actuator of the vertically-actuated switch assembly when a weight of the fire extinguisher supported by the extinguisher attachment falls may be within an alert threshold, and disengages the actuator of the vertically-actuated switch assembly when the weight of the fire extinguisher supported by the extinguisher attachment falls below the alert threshold or when the fire extinguisher may be not supported by the extinguisher attachment, and the alert device generates an alert when the actuator of the vertically-actuated switch assembly may be disengaged.

Although the concepts of the present disclosure are described herein with primary reference to systems and methods for verification of emergency readiness of fire extinguishers, it is contemplated that the concepts will enjoy applicability to any fluid of gaseous storage systems or systems which may be subject to periodic inspection. For example, and not by way of limitation, it is contemplated that the concepts of the present disclosure will enjoy applicability to emergency medical equipment stations.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments described herein generally relate to systems and methods for verification of emergency readiness of fire extinguishers. The systems and methods may include utilization of a spring and extinguisher attachment to measure the mass of a fire extinguisher. The extinguisher attachment may be universal to different makes and models of fire extinguishers. When a fire extinguisher is removed or replaced after being discharged, the systems and methods may generate alerts locally, to remote computers, or the like.

Figure 1:
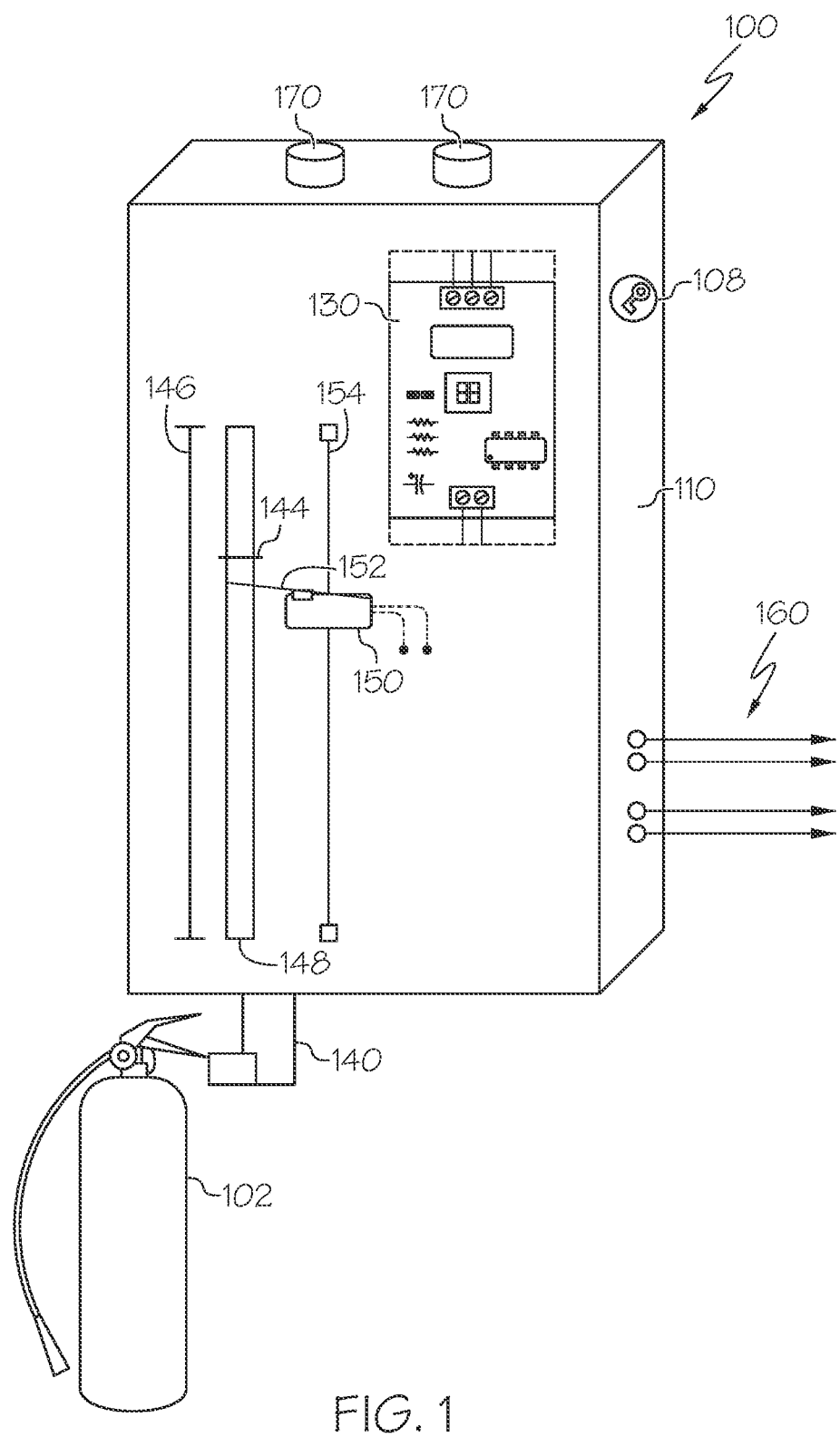
FIG. 1 schematically depicts a system for verification of emergency readiness of fire extinguishers according to one or more embodiments shown and described herein.
Figure 2A:
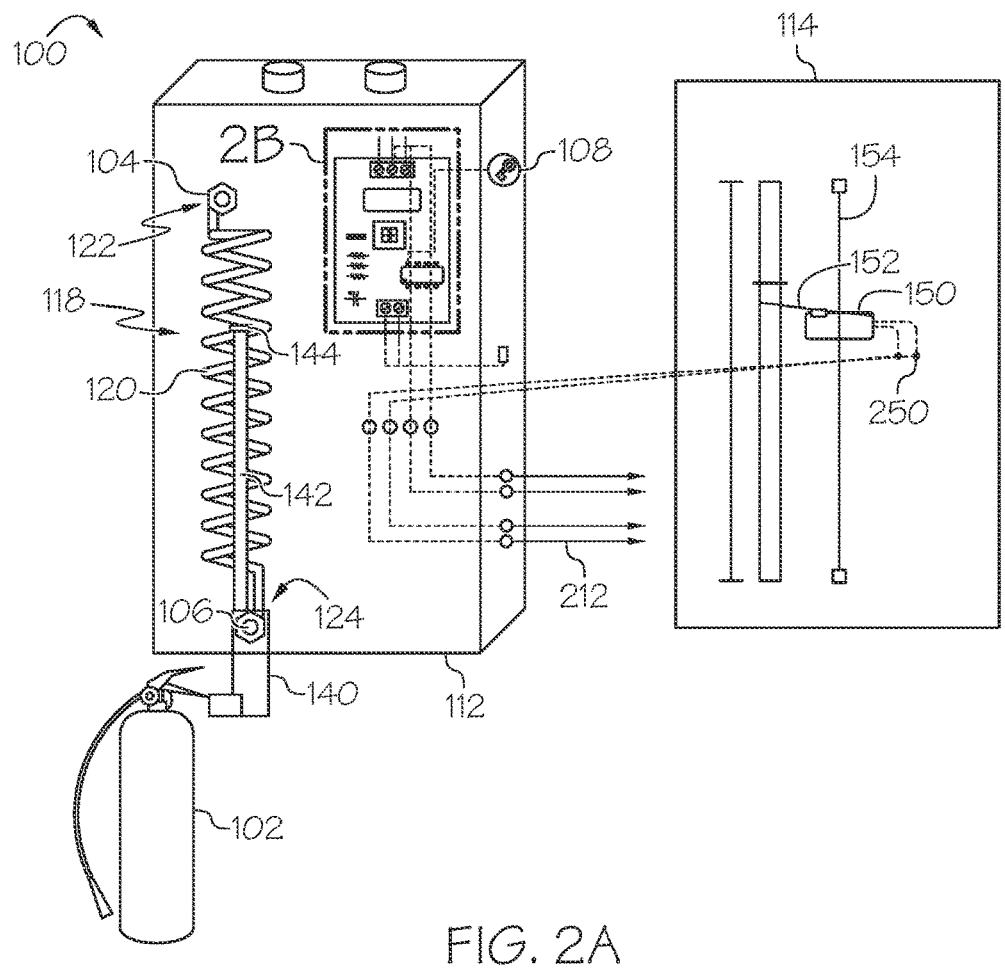
FIG. 2A depicts the system for verification of emergency readiness of fire extinguishers of FIG. 1 with a faceplate removed according to one or more embodiments shown and described herein.
Figure 2B:
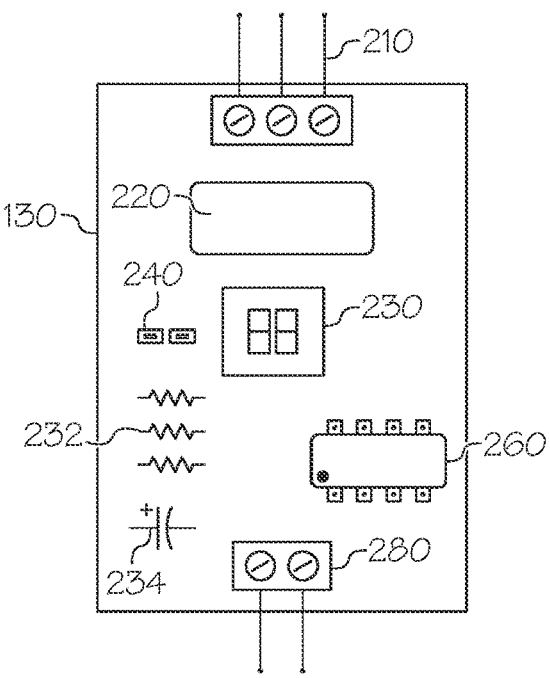
FIG. 2B depicts an enlarged view of the control board of the system for verification of emergency readiness of fire extinguishers of FIG. 1 with a faceplate removed according to one or more embodiments shown and described herein.

Referring initially to FIGS. 1 and 2A-2B, a system 100 verification of emergency readiness of fire extinguishers can be disposed at a facility. The system 100 can comprise a housing 110 that houses operative components of the system 100. The housing 110 can be a stand-alone structure, mountable to appropriate vertically-oriented structures, or the like. References herein to "vertical" and "vertically" refer to component orientation when the emergency readiness verification system of the present disclosure is in use, e.g., when it is mounted to a wall or other vertically-oriented structure. The housing 110 can be constructed of plastic, metal, glass, or the like. It is noted that the size and shape of the housing may vary. FIG. 2A depicts the system 100 with a removable faceplate 114 of the housing 110 open or removed from a body 112 of the housing 110.

The system 100 can comprise a secure weight-sensing mechanism 118. The secure weight-sensing mechanism 118 may be secured at least partially behind or covered by the removable faceplate 114 of the housing 110, and within the body 112. In embodiments, the weight-sensing mechanism 118 may include a spring 120, an extinguisher attachment 140, and an attachment extension 142. The spring 120 may be attached to the housing 110. The spring 120 may be a vertically-oriented weight-bearing spring having a vertical axis. The spring may comprise a spring constant k of between approximately 0.40 kg/mm (e.g., approximately 22.40 lbs/in.) and approximately 0.50 kg/mm (e.g., approximately 28 lbs/in). In other examples, the spring constant k may be between approximately 0.20 kg/mm (e.g., approximately 11.12 lbs/in) and approximately 1.00 kg/mm (e.g., approximately 56 lbs/in).

A body attachment end 122 of the spring 120 may be attached to the housing 110, such as via a spring-body extinguisher attachment 104. The spring-body extinguisher attachment 104 may comprise a hook, a fastener (e.g., bolt, screw, etc.), bar, or the like. The spring 120 may be suspended from the spring-body extinguisher attachment 104. In embodiments, the spring 120 may comprise a helically formed compression spring. According to examples, the spring 120 may be calibrated to receive weight from 0 kg or lbs. up to i kg or lbs., where i is a number. For instance, the spring 120 may be calibrated to measure or weigh objects between 0 to substantially 70 kg (substantially 155 lbs.), 0 to 50 kg (substantially 110 lbs.), 0 to 40 kg (substantially 88 lbs.), etc. The spring 120 may comprise a tolerance t % for mass scale, where t is a number (e.g., 1, 2, 3, etc.).

The spring 120 may comprise a metal material or the like. In some examples, the metal material may comprise a rustproof steel that may withstand adverse temperatures without substantial variation or degradation of the elasticity or extension of the spring 120. For example, the system 100 may be disposed in an industrial facility where heat may be generated such that the heat raises the ambient temperature surrounding the spring 120.

An extinguisher attachment end 124 of the spring 120 may include or be coupled with an extinguisher attachment 140. For instance, the extinguisher attachment 140 may be coupled to the extinguisher attachment end 124 via a fastener, a welded joint, a chemical adhesive, or the like. The extinguisher attachment 140 may comprise a hook, clasp, or the like. It is noted that the extinguisher attachment 140 may comprise any appropriate material, such as a metal, plastic, or the like. The extinguisher attachment 140 may be configured to receive a fire extinguisher 102. When the fire extinguisher 102 is attached to the extinguisher attachment 140, the extinguisher attachment 140 applies a downward force on the spring 120. The downward force causes the spring 120 to expand or elongate. The amount of elongation of the spring 120 correlates to a weight of the fire extinguisher 102.

According to at least some embodiments, the extinguisher attachment 140 may comprise or be coupled with an attachment extension 142 which may be vertically oriented. A vertical axis of the extinguisher attachment 140 may extend through the attachment extension 142. In examples, the attachment extension 142 and the extinguisher attachment 140 may be monolithically formed or a plurality of components fixed together. The attachment extension 142 may extend from proximal the extinguisher attachment 140 towards the body attachment end 122 of the spring 120. An engagement tab 144 may extend from the attachment extension 142. In at least some embodiments, the engagement tab 144 may be oriented to extend through a vertically-oriented measurement aperture 148 formed through the faceplate 114. For instance, the attachment extension 142 may be substantially parallel with the vertically-oriented measurement aperture 148. The engagement tab 144 may extend from the attachment extension 142 at an angle (e.g., perpendicularly, an acute angle, and obtuse angle, etc.) towards the vertically-oriented measurement aperture 148.

In response to weight being applied or removed from the extinguisher attachment 140, the extinguisher attachment translates downward or upward, respectively. The attachment extension 142 and the engagement tab 144 may likewise translate with the extinguisher attachment 140. Thus, the engagement tab 144 may proportionally move upwards or downwards based on the amount of weight applied to the extinguisher attachment 140. In embodiments, the faceplate 114 of the housing 110 may include a vertically-oriented measurement aperture 148. The vertically-oriented measurement aperture 148 may allow the engagement tab 144 to be seen or accessed when the faceplate 114 is closed with the body 112 of the housing 110. In another aspect, the faceplate 114 may include gradient markings 146. The gradient markings 146 may indicate a weight in a unit of measurement. The spring 120 may be calibrated such that the engagement tab 144 is at a 0 gradient marking when no weight is applied to the extinguisher attachment 140. When weight is applied, the spring 120 may stretch an amount based on the amount of weight. For example, if a 25 kg (e.g., approximately 55 lbs.) weight is applied to the extinguisher attachment, the spring 120 will stretch a determined amount such that the engagement tab will be substantially coplanar with a 25 kg gradient marking.

The system 100 may include a switch 150 that may operatively switch between an open state and a closed state depending on the amount of weight applied to the extinguisher attachment 140. According to embodiments, the switch 150 may be a vertically-actuated switch assembly that may be selectively positionable about an axis, such as about a vertical axis of calibration mechanism 154. The calibration mechanism 154 may comprise a vertically-adjustable calibration mechanism secured to the faceplate 114 that may extend parallel to the vertically-oriented measurement aperture 148. The calibration mechanism 154 may comprise a bar, wire, or the like upon which the switch 150 may be attached. The switch 150 may be attached to the guide via a clasp, fastener, magnet, or the like. It is noted that the switch 150 may be attached directly to the housing 110 or attached to the housing 110 via any appropriate means. Further, the switch 150 may be hermitically sealed to avoid false activation, damages, or degradation. It is further noted that switch 150 may be protected by a cover or the like. By selectively positioning the switch 150, the switch 150 may detect when the weight applied to the extinguisher attachment deviates from a calibrated weight. For instance, the calibration mechanism 154 may be operable to fix a vertical position of the switch 150 such that the engagement tab 144 of the attachment extension 142 engages the actuator 152 of the switch 150 assembly when a weight of a fire extinguisher 102 supported by the extinguisher attachment 140 falls below an alert threshold or when no fire extinguisher is supported by the extinguisher attachment 140.

In some embodiments, the switch 150 may comprise a contact switch having an actuator 152 that is biased to place the switch 150 in an open state. When force is applied to the actuator 152 (such as by engagement tab 144), the actuator 152 may cause the switch 150 to be in a closed state. The actuator 152, for instance, may comprise a bar or strip of metal that may be pressed to activate or close the switch 150. It is noted that other types of switches may be utilized. For instance, the switch 150 may comprise a reed switch, infrared switch, or the like. As an example, the engagement tab 144 or attachment extension 142 may comprise a magnet. The switch 150 may be in either an open state or a closed state based on whether the magnet is within range of the switch 150. In an aspect, the spring 120 and switch 150 may not require any source of power to measure or determine whether the weight attached to the extinguisher attachment 140 has altered. It is further noted that the system 100 may allow for any appropriately sized fire extinguisher 102 to be utilized without modifications or specialized pressure gauges.

For example, a user may attach the fire extinguisher 102 to the extinguisher attachment 140. The extinguisher attachment 140 may pull down on the spring 120 and displace the attachment extension 142 and/or engagement tab 144 to a set position. The user may then slide or otherwise position the switch 150 such that the engagement tab 144 engages the actuator 152. The actuator 152 may actuate the switch 150, such as to place the switch 150 in a closed state. Once the switch 150 is in a closed state, the user may leave the switch 150 at the position, which may comprise a calibration position correlated with a calibrated weight of a full (non-discharged) fire extinguisher 102. If the fire extinguisher 102 is removed or discharged, the weight applied to the extinguisher attachment 140 will be altered (e.g., decreased). The engagement tab 144 will then move upward and disengage the actuator 152. In response, the switch 150 will enter an opened state.

In some examples, the switch 150 may be configured to allow for a tolerance for deviation from a calibrated weight or position. For instance, the switch 150 can be configured to remain in a closed state for a spring variance rate (which may be determined based on the particular spring implemented) plus or minus ten percent of the calibration weight. In some embodiments, the switch 150 may be configured to remain in a closed state when the weight applied to the extinguisher attachment 140 causes the engagement tab 144 to deviate a threshold distance from the switch 150. For example, the switch 150 may remain in a closed state if the weight applied to the extinguisher attachment 140 deviates by up to one kilogram. In an aspect, the tolerance may allow for variations in the elasticity of the spring 120 due to changes in the ambient environment (e.g., temperature, humidity, etc.).

As described herein, if the mass of the fire extinguisher deviates or the fire extinguisher 102 is otherwise removed, the system 100 may initiate an alarm to identify that the fire extinguisher 102 has been removed or used. The mass reduction resulting from use triggers the system 100 to alert that fire extinguishers 102 are not at full capacity. The alert may be generated by one or more audio devices (e.g., speakers, bells, etc.), visual devices (lights, computer displays, etc.), or tactile devices (e.g., vibration devices, etc.). For instance, alert devices 170 may be disposed on or within the housing 110, at a local facility, or at a remote station. The switch 150 may be coupled to a control device or the alert devices 170 via outputs 212. If the switch 150 identifies that the state of the switch 150 is open (such as by terminating a signal), the alert devices 170 may be activated by discrete circuit elements or a control board 130 (as described here and elsewhere in this disclosure). Power may be supplied to the alert devices 170 via a power source 280 (e.g., a battery, power mains, etc.). The alert devices 170 may include one or more lights that may be configured to turn one (e.g., emit light) in a predetermined pattern, such as a flashing pattern or rate, continuous light, color coded light, or the like. In an example, the alert devices 170 may include a red light that can be activated (e.g., turned on) when the switch 150 detects that the fire extinguisher 102 is not in place on the extinguisher attachment 140 or has deviated from a calibrated rate signifying that the fire extinguisher 102 does not have a sufficient amount of fluid.

In at least some embodiments, the system 100 may monitor, track, or otherwise manage inspections of the fire extinguisher 102. For instance, fire extinguishers 102 may require periodic inspections by users per rules provided by a government, organization, manufacturer, or the like. The system 100 may be configured to determine whether a user has conducted the inspection within a predefined period or according to a predefined schedule. The period or schedule may comprise days, months, or other measurements of time. In an example, the period may be a month, 30 days, or the like. It is noted that the system 100 may monitor for inspections locally and/or remotely. In some examples, Additionally or alternatively, the control board 130 may comprise an electronic timer that validates the fire extinguisher 102 inspection on a periodic basis. This will alert the proponent to take the required action to ensure fire extinguisher readiness. The control board 130 may monitor user interaction with the system to determine whether a user has conducted an inspection. If a user has not conducted an inspection, the system 100 may generate one or more alerts. The alert may be generated by one or more audio devices (e.g., speakers, bells, etc.), visual devices (lights, computer displays, etc.), or tactile devices (e.g., vibration devices, etc.). For instance, alert devices 170. The alert devices 170 may be configured to light in a predetermined pattern, such as a flashing pattern or rate, continuous light, color coded light, or the like. In an example, the alert devices 170 may include a green light that can be activated (e.g., turned on) when the control board 130 detects that the inspection has not occurred within the period.

As shown in greater detail in FIG. 2B, the control board 130 may comprise a timer relay board which may include nodes or input/output contacts 210, a relay circuit 220, a time period selection circuit 230, a reset jumper circuit 240 (which may be operatively connected with a timer reset interface 108), a timer circuit 260, and the power source 280 (which may include a power source or a connection to a power source). In an example, the timer circuit 260 may comprise an integrated circuit, such as a 555 integrated timer circuit. The timer circuit 260 may include discrete circuit elements (e.g., transistors, diodes, resistors, etc.). The timer circuit 260 may be configured as a timer, a waveform generator, oscillator, or the like. The timer circuit 260 may trigger an alert if the control board 130 does not detect inspection of the fire extinguisher 102 within a time period. Detection of inspection, may include detecting input from a timer reset interface 108. The timer reset interface 108 may include a user interface device, such as a wireless device (receiver, transponder, etc.), physical key and lock (which may activate an electronic switch), a key pad, a button, a biological scanner (e.g., finger print scanner), a card reader (e.g., magnetic card reader, etc.), or the like. In at least one example, the timer reset interface 108 may include a wireless key fob reader that responds to a user placing a key fob within a coverage area of the key fob reader. In response to the key fob being placed within the coverage area, the key fob reader may activate a reset jumper circuit 240 to reset the timer circuit 260.

It is noted that authorized users may be provided with key fobs and may scan or swipe the key fob as part of an inspection process. An inspection process may, for instance, include notifying a user to inspect the fire extinguisher 102 according to regulatory procedures. The procedures may include:

1) Located in designated fire extinguisher 102;
2) Ensure the fire extinguisher 102 and/or signage for indicating location of fire extinguisher 102 is visible and unobstructed;
3) Ensure access to the fire extinguisher 102 is unobstructed;
4) Ensure pressure gauge readings or indicators are in the operable range or position;
5) Ensure fire extinguisher 102 is full (determined by hefting or weighing);
6) Correct any issues; and
7) Provide input to the timer reset interface 108 to indicate the inspection is complete.

It is noted that other or different procedures may be utilized such may be required by governing bodies, organizations, or the like. As such, the above inspection procedure is provided as an exemplary procedure.

In examples, time period selection circuit 230 may comprise a switch operatively connected to one or more capacitors 232 and/or one or more resistors 234 to select one or more time periods. A user, such as an administrator with access to the control board 130, may set the switch to a desired position to select a period. A pulse provided to the time period selection circuit 230 to the timer circuit 260 may comprise the time period (T) and may be determined by one or more capacitors 232 (C) and the one or more resistors 234 (R) according to the following: $T=1.1 \times R \times C$, where T is in seconds, R is resistance in ohms, and C is capacitance in farads. The position of the switch of the time period selection circuit 230 may selectively activate desired ones of the one or more capacitors 232 and one or more resistors 234 to set the time period T.

According to another aspect, the system 100 may prevent or reduce generation of false alerts. For instance, the system 100 may utilize dual voting algorithms. The dual voting may include, generating one or more alerts (e.g., local alerts or remote alerts) in response to two or more conditions, such as both a weight of the fire extinguisher 102 deviating from a calibrated weight and a period passing without a user resetting a timer through the reset jumper circuit 240. In another example, dual voting may include determining the weight of the fire extinguisher 102 deviating from a calibrated weight and a delay time period for the switch 150 to be open. This may, for example, allow a user to remove the fire extinguisher 102 for inspection without alerts being generated as long as the user replaces the fire extinguisher 102 within the delay time period. In another example, the delay time period may prevent generation of alerts from seismic activity, bumping of the fire extinguisher, or other events which may cause the spring 120 to fluctuate for a short period.

In some embodiments, system 100 may utilize for one or more sensors, image capturing devices, or the like to verify whether to generate an alert or to identify a possible false alert. The one or more sensors may include motion sensors, accelerometers, optical sensors, audio sensors, gaseous sensors, smoke sensors, or the like. In an example, the system 100 may include an optical sensor that detects the presence, absence, or movement of an object. If the switch 150 determines that the fire extinguisher 102 has been removed or has deviated from a calibration weight, the switch 150 may activate the optical sensor to determine if the fire extinguisher is present on the extinguisher attachment 140. If the fire extinguisher 102 is not present, the alert may be generated. If the fire extinguisher 102 is present, the alert may not be generated. It is noted that the optical sensor may actively monitor for the fire extinguisher 102 at all times or periodically. However, such monitoring may consume power. Thus activation of the optical sensor upon opening of the switch 150 may reduce power consumption. In another example, the system 100 may include a motion sensor that may be configured to detect movement of the housing 110, spring 120, or the like. If the switch 150 is open and no motion is detected of the spring 120, it may be assumed that the fire extinguisher 102 has not been moved and an alert may not be generated. However, if motion is detected in the spring 120 and the switch 150 is open, the system 100 may generate alerts. It is noted, that embodiments may utilize various combinations of aspects described herein. For instance, an optical sensor may be utilized with a delay timer or the like.

In other embodiments, the control board 130 may include a processor and one or more memory devices that may comprise RAM, ROM, flash memories, hard drives, or any device capable of storing computer readable and executable instructions (e.g., logic) such that the computer readable and executable instructions can be accessed by the one or more processors. The computer readable and executable instructions may cause the one or more processors to perform actions, such as monitor for user inspection, set predefined periods or schedules, log events (inspections, user interactions, alerts, weight measurements, etc.), control the alert devices 170, record a calibration weight (e.g., such as by determining the position of the switch 150 on the calibration mechanism 154), or the like. In other examples, the computer readable and executable instructions may apply a tolerance for deviation in measured weight. If the measured weight is within the tolerance (e.g., between an upper threshold and a lower threshold), an alert may not be generated. The tolerance may be set at a predetermined value or may be calculated based on environmental factors (e.g., humidity, temperature, etc.), age of a spring, applied weight, history of alerts or usage of the system 100, or combinations thereof.

Embodiments may additionally or alternatively provide for remote computer monitoring of the system 100 through the dry contact as described herein. For instance, the system 100 may include one or more outputs 212 that may be generated by the control board 130, the switch 150, or other components. The outputs 212 may be provided to a remote computing device, remote alert system, or the like. It is noted that the outputs 212 may be coupled to a network via a wireless or a wired connection as described herein. For instance, a remote computing device may receive data from the system 100 identifying that an alert has been generate, identifying a type of alert (e.g., inspection timer, fire extinguisher 102 has been removed or has deviated from calibration weight, etc.), data identifying the location and identification of the system 100, or the like. An administrator may take an appropriate action in case of the fire extinguisher 102 being used, suffering from a pressure drop, improperly placed, or the like. Moreover, the administrator may be alerted that the monthly inspection has or has not been conducted. According to aspects, the system 100 may allow for continuous and/or real-time monitoring of the fire extinguisher 102 readiness, inspection status, or the like.

Figure 3:
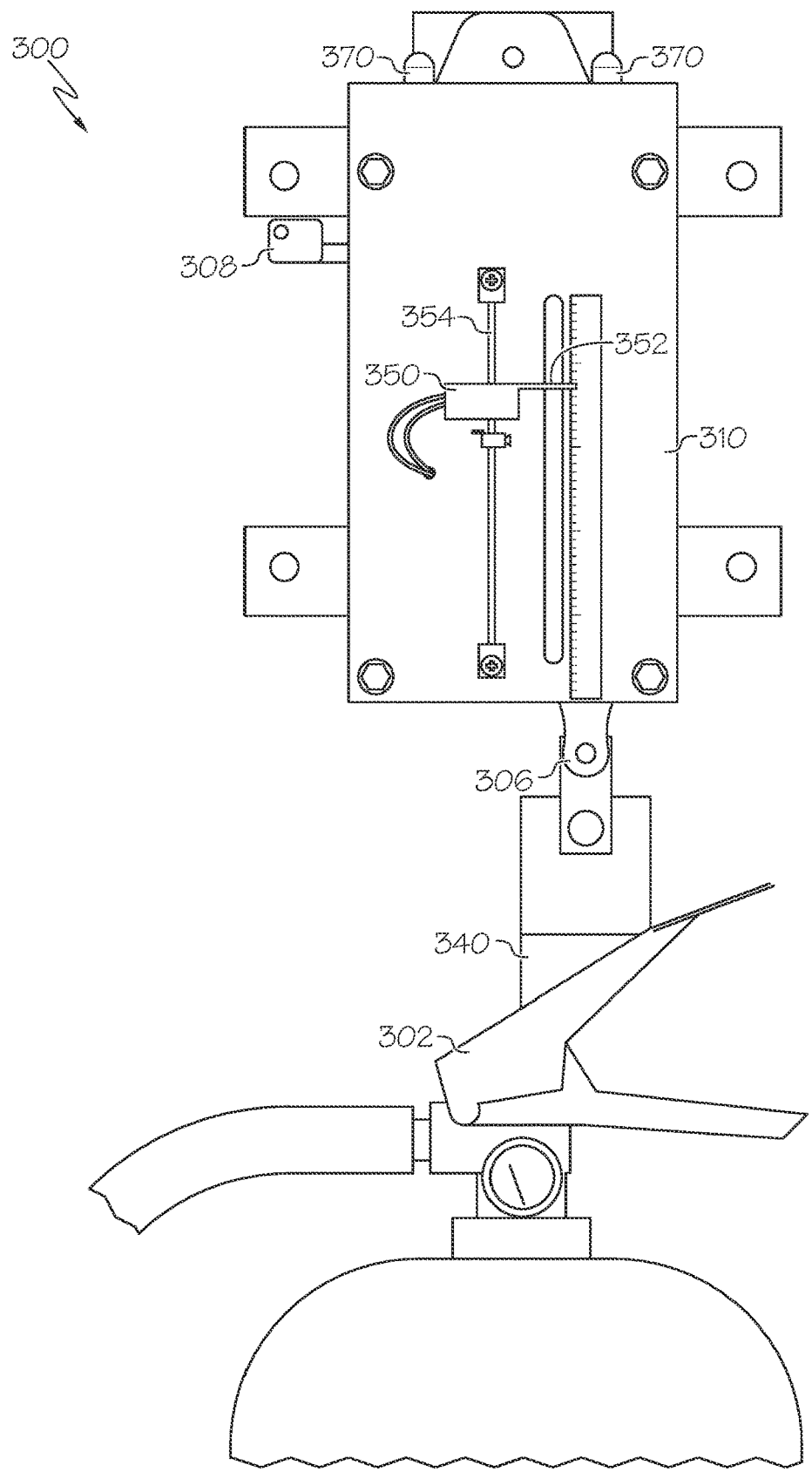
FIG. 3 depicts a calibrated system for verification of emergency readiness of fire extinguishers according to one or more embodiments shown and described herein.
Figure 4:
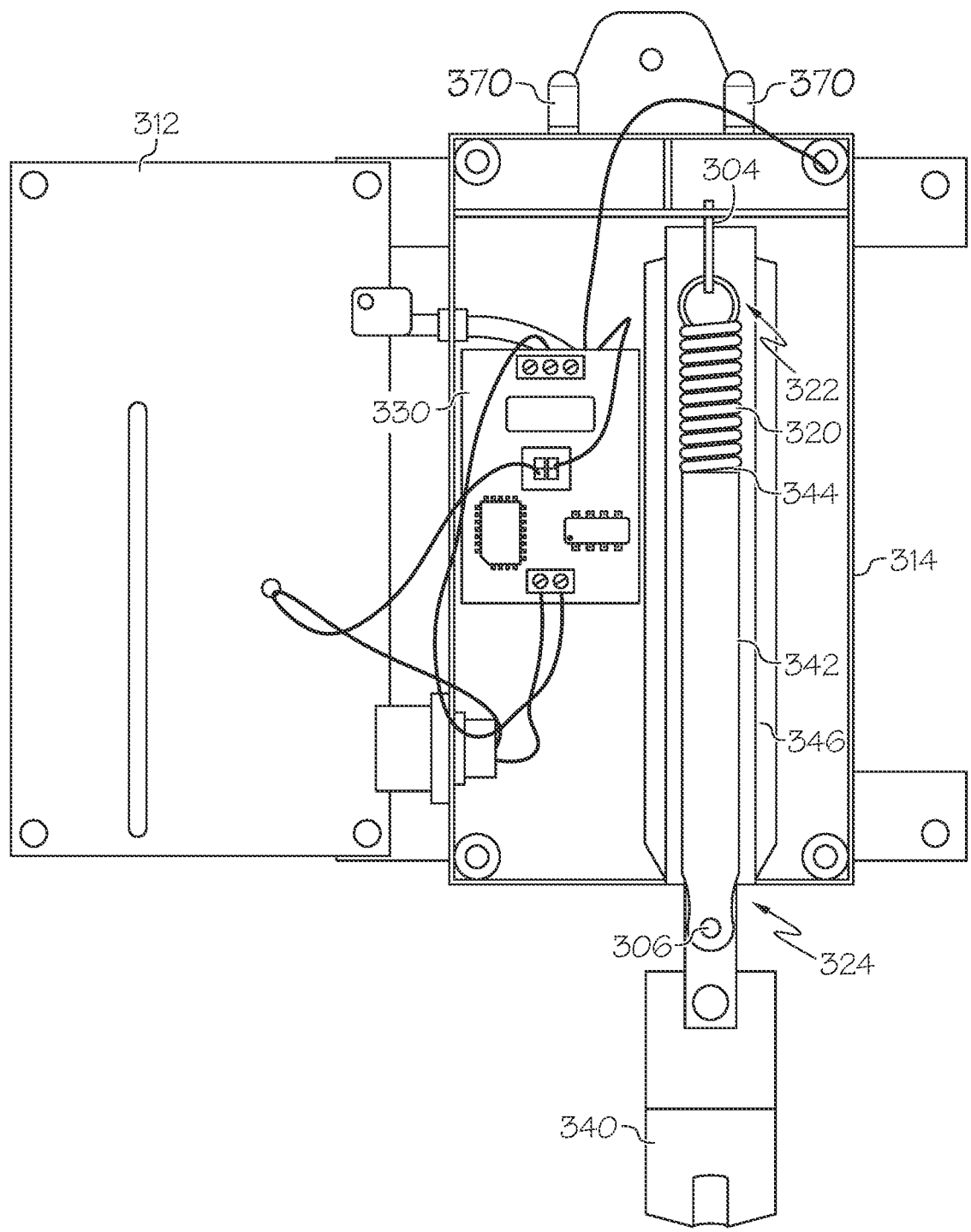
FIG. 4 depicts the system for verification of emergency readiness of fire extinguishers of FIG. 3 with a housing faceplate removed according to one or more embodiments shown and described herein.

Turning now to FIGS. 3 and 4, these figures depict a calibrated system 300 for verification of emergency readiness of fire extinguishers. FIG. 4 depicts a housing 310 with a faceplate 314 of the housing 310 open or removed from a body 312 of the housing 310. It is noted that like named components of system 100 and 300 may comprise similar or the same aspects unless context suggests otherwise or warrants a particular distinction. In an example, the housing 310 and the housing 110 may comprise similar or the same components, such as a faceplate 314/114 and a body 312/112.

In embodiments, the system 300 can include a secure weight-sensing mechanism 318. The secure weight-sensing mechanism 318 may include a spring 320. The spring 320 may comprise a body attachment end 322 and an extinguisher attachment end 324. The body attachment end 322 may be attached to the body 312 via a spring-body extinguisher attachment 304. The extinguisher attachment end 324 may include a spring-extinguisher attachment 306 that may attach an extinguisher attachment 140 to the spring 320. The extinguisher attachment 340 may receive a fire extinguisher 302. In another aspect, the extinguisher attachment 340 may include an attachment extension 342 extending away from the extinguisher attachment end 324 and towards the body attachment end 322. The attachment extension 342 may comprise a bar, rod, strip, or other body. The attachment extension 342 may include or be coupled with an engagement tab 344. The body 312 of the housing 310 may include a track 316. The track 316 may comprise one or more walls, grooves, extensions, or other physical formations that may guide, support, protect, or otherwise provide a space for the spring 320 and/or the attachment extension 342. In some embodiments, the track 316 may prevent unwanted motion from the spring 320 or attachment extension 342, such as side-to-side motion (relative to the depicted orientation) or the like.

The system 300 may further include a switch 350. The switch 350 may comprise a vertically-actuated switch that may be attached to the housing via a calibration mechanism 354. The calibration mechanism 354 may comprise a vertically-adjustable calibration mechanism having a vertical axis. The calibration mechanism 354 may include string, wire, cable, bar, tube, or the like and may be generally parallel with the spring 320. In some examples, the calibration mechanism 354 may be attached to the faceplate 314 of the housing 310 or may be integrally formed with the faceplate 314. It is noted that the calibration mechanism 354 may comprise channels formed in the faceplate 314, holes, or other formations and may not comprise a string, wire, cable, bar, tube, or the like. The switch 350 may be selectively attached to the calibration mechanism 354 via a fastener or the like, such as a set screw 356. The set screw 356 may be tightened or loosened to allow a user to selectively position the switch 350 for calibration. It is noted that calibration may be automated, such as by a motor that may move the switch 350 to until an actuator 352 actuates the switch 350 (e.g., causes the switch 350 to change states).

According to some embodiments, the system 300 may include a control board 330 which may comprise similar or the same components as the control board 130 for FIGS. 1-2. In another aspect, the system 300 may include a timer reset interface 308 operatively coupled to the control board 330. The timer reset interface 308 may comprise a key and lock, wherein the key may allow the lock to turn. When the lock turns, the timer reset interface 308 may cause a timer circuit to reset.

It is noted that the system 300 may include one or more alert devices 370. The alert devices 370 may comprise one or more audio, visual, or other alert devices. It is further noted that the system 300 may be communicatively coupled to remote computing devices. The remote computing devices may receive data from the system 300 to identify that a fire extinguisher is operable or is not operable, an inspection has occurred or failed to occur, or the like.

Figure 5:
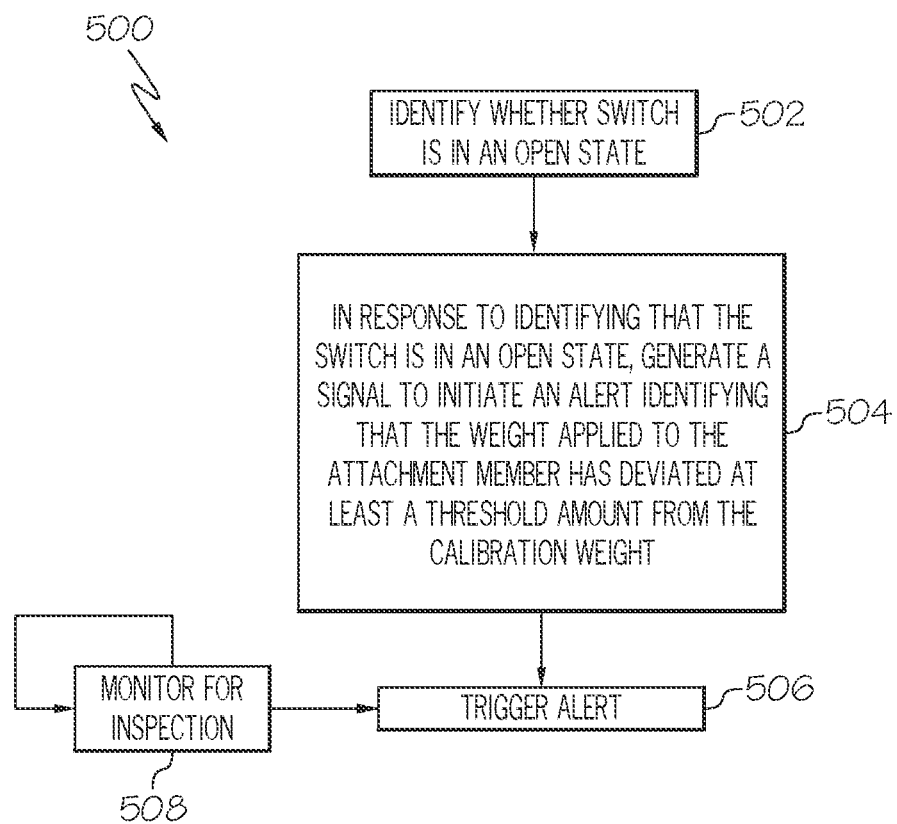
FIG. 5 depicts a flowchart of an exemplary algorithm for verification of emergency readiness of fire extinguishers according to one or more embodiments shown and described herein.

In view of the subject matter described herein, methods that may be related to various embodiments may be better appreciated with reference to the flowchart of FIG. 5. The flow chart of FIG. 5 depicts an exemplary method 500 for verification of emergency readiness of fire extinguishers. While the methods are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 5 depicts an exemplary flowchart of non-limiting method 500 associated with verification of emergency readiness of fire extinguishers, according to various aspects of the subject disclosure. As an example, method 500 may monitor a calibrated system for verification of emergency readiness of fire extinguishers. The calibrated system may include a switch selectively positioned at a calibration weight.

At 502, a system, such as system 100 or 300, may identify whether a switch is in an open position. For instance, if a fire extinguisher is removed from an extinguisher attachment, an engagement tab may be displaced. The displaced engagement tab may allow an actuator to modify a state of a switch, such as modify a switch in a closed state to an open state. It is noted that embodiments may utilize an actuator to place a switch in a closed state to signify that a fire extinguisher has been removed or is otherwise modified from a calibration rate. Moreover, embodiments may utilize one or more switches which may have two or more states.

At 504, a system may, in response to identifying that a switch is in an open state, generate a signal to trigger an alert identifying that the weight applied to an extinguisher attachment has deviated at least a threshold amount from a calibration weight. The signal may be transmitted to local devices, such as lights, audio devices, or the like. The signal may, additionally or alternatively, be transmitted to a remote computing device.

At 506, a system may trigger an alert. For instance, if a fire extinguisher is removed or replaced after being discharged (partially or wholly), a system may generate one or more audible, visual, tactile, or other alerts as described herein. In some embodiments, the alert may be triggered locally, remotely, or both.

At 508, a system may monitor for inspection of a fire extinguisher. Monitoring for inspection may include monitoring for user input, such as through a wireless reader, magnetic card reader, key pad, or other interface device. In another aspect, monitoring may include determining whether a predetermined amount of time has passed through the use of an electronic timer.

Figure 6:
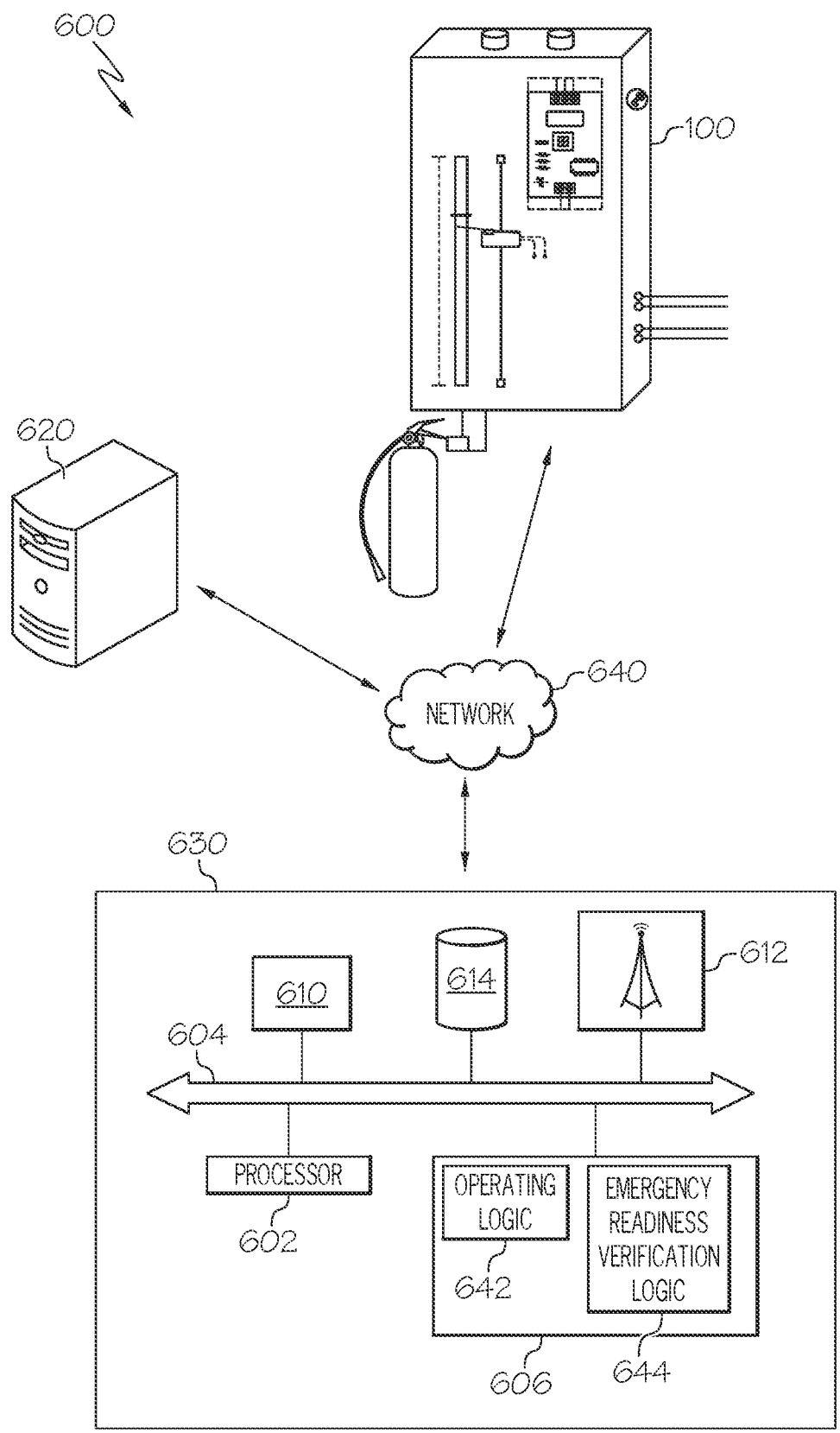
FIG. 6 depicts a schematic illustration of a computing network for a system for remote computer monitoring of emergency readiness of fire extinguishers according to embodiments shown and described herein.

FIG. 6 depicts an example computing system 600 for performing the functionalities as described herein. In some embodiments, the computing system 600 may include a system verification of emergency readiness of fire extinguishers (e.g., 100, 300, etc.) comprising a computing device 630. The example computing device 630 of the computing system 600 includes one or more processors 602, a communication path 604, one or more memory devices 606, one or more sensors 610, network interface hardware 612, and a data storage device 614, the details of which will be set forth in the following paragraphs. It should be understood that the computing system 600 of FIG. 6 is provided for illustrative purposes only, and that other computing systems comprising more, fewer, or different components may be utilized. It is further noted that components of the computing system 600 may be comprised within a single device or distributed among devices. For instance, portions of computing device 630 may reside within a system for verification of emergency readiness of fire extinguishers, or the like.

Each of the one or more processors 602 may be any device capable of executing computer readable and executable instructions. Accordingly, each of the one or more processors 602 may be a controller, an integrated circuit, a microchip, a computer, or any other computing device. The one or more processors 602 are coupled to a communication path 604 that provides signal interconnectivity between various modules of the computing system 600. Accordingly, the communication path 604 may communicatively couple any number of processors 602 with one another, and allow the modules coupled to the communication path 604 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 604 may be formed from any medium that is capable of transmitting a signal such as, for example, conductive wires, conductive traces, optical waveguides, or the like. In some embodiments, the communication path 604 may facilitate the transmission of wireless signals, such as WiFi, Bluetooth®, Near Field Communication (NFC) and the like. Moreover, the communication path 604 may be formed from a combination of mediums capable of transmitting signals. In one embodiment, the communication path 604 comprises a combination of conductive traces, conductive wires, connectors, and buses that cooperate to permit the transmission of electrical data signals to components such as processors, memories, sensors, input devices, output devices, and communication devices. Accordingly, the communication path 604 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The computing system 600 includes one or more memory devices 606 coupled to the communication path 604. The one or more memory devices 606 may comprise RAM, ROM, flash memories, hard drives, or any device capable of storing computer readable and executable instructions such that the computer readable and executable instructions can be accessed by the one or more processors 602. The computer readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into computer readable and executable instructions and stored on the one or more memory modules 406. Alternatively, the computer readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory devices 606 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. The one or more memory devices 606 include logic in the form of computer readable instructions that perform the functionalities described herein. The one or more memory devices 606 may be configured to store operating logic 642 and emergency readiness verification logic 644 (each of which may be embodied as a computer program (i.e., computer readable instructions), firmware, or hardware, as an example). The operating logic 642 may include an operating system and/or other software for managing components of the computing device 630. In another aspect, the emergency readiness verification logic 644 may reside in the memory devices 606 and may be configured to facilitate monitoring of the system 100 (and/or 300) for verification of emergency readiness of fire extinguishers, such as verifying inspections, weight of a fire extinguisher, or the like. The emergency readiness verification logic 644 may be configured to generate alerts, store usage logs, receive status updates, or the like. The emergency readiness verification logic 644 may be configured to provide other aspects disclosed herein.

The data storage device 614, which may generally be a storage medium, may contain one or more data repositories for storing data that is received and/or generated, and may be any physical storage medium, including, but not limited to, a hard disk drive (HDD), memory, removable storage, and/or the like. While the data storage device 614 is depicted as a local device, it should be understood that the data storage device 614 may be a remote storage device, such as, for example, a server computing device or the like. In some embodiments, the data storage device stores map information, such as the high-definition map data described above. It should be understood that the data storage device is not provided in some embodiments.

Still referring to FIG. 6, the computing system 600 may comprise network interface hardware 612 for communicatively coupling the computing system 600 to a remote computing device 620, such as, without limitation, the system 100 and/or a remote server. The network interface hardware 612 can be communicatively coupled to the communication path 604 and can be any device capable of transmitting and/or receiving data via a network 640. Accordingly, the network interface hardware 612 can include a communication transceiver for sending and/or receiving wireless communications. For example, the network interface hardware 612 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 612 includes hardware configured to operate in accordance with the Bluetooth® wireless communication protocol.

The remote computing device 620 may allow an administrative user to monitor the state of emergency equipment, such as the systems 100, 300 and/or fire extinguishers. The remote computing device 620 may, for example, receive data identifying whether the weight applied to the system 100 meets a calibration weight or deviates from the calibration weight (e.g., with or without a tolerance), whether an inspection has been completed, whether the time period for an inspection has passed, or other aspects as described herein.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An emergency readiness verification system for a fire extinguisher, the system comprising
   a housing,
   a secure weight-sensing mechanism,
   a vertically-actuated switch assembly,
   a vertically-adjustable calibration mechanism, and
   an alert device in communication with the vertically-actuated switch assembly, wherein:
   the housing comprises a removable faceplate;
   the secure weight-sensing mechanism is supported by the housing, is at least partially positioned behind the removable faceplate of the housing, and comprises a vertically-oriented weight-bearing spring, an extinguisher attachment, and an attachment extension;
   the removable faceplate of the housing comprises a vertically-oriented measurement aperture;
   the attachment extension of the secure weight-sensing mechanism extends from the extinguisher attachment along a vertical axis of the vertically-oriented weight-bearing spring, and comprises an engagement tab oriented to extend through the vertically-oriented measurement aperture;
   the vertically-adjustable calibration mechanism is secured to the removable faceplate and extends parallel to the vertically-oriented measurement aperture;
   the vertically-actuated switch assembly is secured to the vertically-adjustable calibration mechanism and comprises an actuator that is positioned to be engaged by the engagement tab of the attachment extension;
   the vertically-adjustable calibration mechanism is operable to fix a vertical position of the vertically-actuated switch assembly such that the engagement tab of the attachment extension engages the actuator of the vertically-actuated switch assembly when a weight of the fire extinguisher supported by the extinguisher attachment falls is within an alert threshold, and disengages the actuator of the vertically-actuated switch assembly when the weight of the fire extinguisher supported by the extinguisher attachment falls below the alert threshold or when the fire extinguisher is not supported by the extinguisher attachment; and
   the alert device generates an alert when the actuator of the vertically-actuated switch assembly is disengaged.

2. The system of claim 1, wherein the vertically-oriented weight-bearing spring comprises a spring constant k of between approximately 0.40 kg/mm and approximately 0.50 kg/mm.

3. The system of claim 1, wherein the vertically-actuated switch assembly is communicatively coupled to a remote computing device, and wherein the vertically-actuated switch assembly is operable to:
   generate a switch signal identifying a state of the vertically-actuated switch assembly; and
   initiate transmission of the switch signal to the remote computing device.

4. The system of claim 1, further comprising
   a timer circuit,
   a timer reset interface, wherein
   the timer circuit is disposed within the housing and coupled to the alert device;
   the timer reset interface is coupled to the timer reset interface;
   the timer circuit determines whether an inspection of the fire extinguisher has occurred within an inspection time period;
   the timer reset interface receives input from a user, a key, an identification card, or a combination thereof to indicated that the inspection of the fire extinguisher has occurred;
   in response to receiving the input, the timer reset interface generates a reset signal that causes the timer circuit to reset; and
   in response to the timer circuit determining that the inspection of the fire extinguisher has not occurred within the inspection time period, the timer circuit instructs the alert device to generate an inspection alert.

5. The system of claim 4, further comprising
a time period selection circuit, wherein:
the time period selection circuit is coupled to the timer circuit; and
the time period selection circuit provides a signal to the timer circuit that defines a length of time T for the inspection time period.

6. The system of claim 5, wherein the time period selection circuit includes
a plurality of capacitors having a capacitance C; and
a plurality of resistors having a resistance R, and wherein the length of time T is determined as $T=1.1\times R\times C$.

7. The system of claim 4, wherein the timer circuit is communicatively coupled to a remote computing device, and wherein the timer circuit is operable to initiate transmission of data identifying whether the inspection alert has been generated to the remote computing device.

8. The system of claim 7, wherein the vertically-actuated switch assembly is communicatively coupled to a remote computing device, and wherein the remote computing device is operable to
generate a notification when the actuator of the vertically-actuated switch assembly is disengaged, the inspection alert has been generated, or both.

9. The system of claim 8, wherein the remote computer device comprises an electronic display, and the remote computing device is further operable to
generate the notification on the electronic display.

10. The system of claim 1, further comprising
a controller, wherein:
the controller is communicatively coupled to the vertically-actuated switch assembly and the alert device; and
the controller is operable to instruct the alert device to generate the alert when the actuator of the vertically-actuated switch assembly is disengaged.

11. The system of claim 10 wherein the controller is operable to:
transmit data to a remote computer device; and
wherein the remote computer device comprises an electronic display, wherein the electronic display generates alerts identifying a status of the fire extinguisher.

12. The system of claim 1, wherein the alert device comprises a light, an audio alarm device, or both.

13. The system of claim 1, further comprising a timer circuit and a timer reset interface, wherein:
the timer circuit is disposed within the housing and coupled to the alert device;
the timer circuit is communicatively coupled to a remote computing device;
the timer reset interface is coupled to the timer reset interface;
the timer circuit determines whether an inspection of the fire extinguisher has occurred within an inspection time period;
the timer reset interface receives input from a user, a key, an identification card, or a combination thereof to indicate that the inspection of the fire extinguisher has occurred;
in response to receiving the input, the timer reset interface generates a reset signal that causes the timer circuit to reset;
in response to the timer circuit determining that the inspection of the fire extinguisher has not occurred within the inspection time period, the timer circuit is operable to instruct the alert device to generate an inspection alert and initiate transmission of data identifying whether the inspection alert has been generated to the remote computing device;
the alert device comprises a light, an audio alarm device, or both;
the vertically-actuated switch assembly is communicatively coupled to the remote computing device; and
the vertically-actuated switch assembly is operable to generate a switch signal identifying a state of the vertically-actuated switch assembly and initiate transmission of the switch signal to the remote computing device.

14. A method of calibrating the system of claim 1, comprising:
attaching the fire extinguisher to a extinguisher attachment, wherein the fire extinguisher has not been discharged;
allowing the vertically-oriented weight bearing spring to come to rest;
positioning the vertically-actuated switch assembly at the fixed position on the vertically-adjustable calibration mechanism such that the actuator of the vertically-actuated switch assembly engages the engagement tab of the attachment extension; and
securing the vertically-actuated switch assembly at the fixed position.

15. An emergency readiness verification system for a fire extinguisher, the system comprising
a housing,
a secure weight-sensing mechanism,
a vertically-actuated switch assembly,
a vertically-adjustable calibration mechanism, and
an alert device in communication with the vertically-actuated switch assembly, wherein:
the secure weight-sensing mechanism is supported by the housing, and comprises a vertically-oriented weight-bearing spring, an extinguisher attachment, and an attachment extension;
the attachment extension of the secure weight-sensing mechanism extends from the extinguisher attachment along a vertical axis of the vertically-oriented weight-bearing spring, and comprises an engagement tab;
the vertically-adjustable calibration mechanism is secured to the housing and extends parallel to the vertically-oriented measurement aperture;
the vertically-actuated switch assembly is secured to the vertically-adjustable calibration mechanism and comprises an actuator that is positioned to be engaged by the engagement tab of the attachment extension;
the vertically-adjustable calibration mechanism is operable to fix a vertical position of the vertically-actuated switch assembly such that the engagement tab of the attachment extension engages the actuator of the vertically-actuated switch assembly when a weight of the fire extinguisher supported by the extinguisher attachment falls is within an alert threshold, and disengages the actuator of the vertically-actuated switch assembly when the weight of the fire extinguisher supported by the extinguisher attachment falls below the alert threshold or when the fire extinguisher is not supported by the extinguisher attachment; and
the alert device generates an alert when the actuator of the vertically-actuated switch assembly is disengaged.

* * * * *